United States Patent
Park et al.

(10) Patent No.: US 9,720,282 B2
(45) Date of Patent: Aug. 1, 2017

(54) LIQUID CRYSTAL ALIGNING AGENT AND LIQUID CRYSTAL DISPLAY DEVICE

(71) Applicant: Samsung Display Co., Ltd., Yongin, Gyeonggi-Do (KR)

(72) Inventors: Heungshik Park, Seoul (KR); Jooyoung Yoon, Suwon-si (KR); Dong-Chul Shin, Seoul (KR); Kichul Shin, Seongnam-si (KR); Sung-Jae Yun, Hwaseong-si (KR); Hyeokjin Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 307 days.

(21) Appl. No.: 14/223,485

(22) Filed: Mar. 24, 2014

(65) Prior Publication Data

US 2015/0062513 A1    Mar. 5, 2015

(30) Foreign Application Priority Data

Aug. 28, 2013  (KR) ........................ 10-2013-0102585

(51) Int. Cl.
| | | |
|---|---|---|
| *G02F 1/1337* | (2006.01) | |
| *C09D 179/08* | (2006.01) | |
| *C08G 73/10* | (2006.01) | |

(52) U.S. Cl.
CPC ... *G02F 1/133723* (2013.01); *C08G 73/1075* (2013.01); *C09D 179/08* (2013.01); *Y10T 428/1023* (2015.01)

(58) Field of Classification Search
CPC ............ G02F 1/133723; C09D 179/08; C08G 73/1075; C08L 63/00; Y10T 428/1018; Y10T 428/1023
See application file for complete search history.

(56) References Cited

U.S. PATENT DOCUMENTS

| | | | |
|---|---|---|---|
| 6,312,769 B1 * | 11/2001 | Hiraoka ............ | G02F 1/133723 252/299.4 |
| 6,583,834 B1 * | 6/2003 | Uchiyama ........... | G02F 1/13452 257/E21.514 |
| 6,831,148 B2 | 12/2004 | Buchecker et al. | |
| 7,074,344 B2 | 7/2006 | Nakata et al. | |
| 7,959,990 B2 | 6/2011 | Cherkaoui et al. | |
| 2002/0054966 A1 * | 5/2002 | Shin ...................... | C08G 69/02 428/1.25 |

(Continued)

FOREIGN PATENT DOCUMENTS

| | | |
|---|---|---|
| JP | 2002-323701 A | 11/2002 |
| JP | 2006-215326 A | 8/2006 |

(Continued)

*Primary Examiner* — Sophie Hon
(74) *Attorney, Agent, or Firm* — Cantor Colburn LLP (57) ABSTRACT

A liquid crystal display device includes a first substrate, a first alignment layer on the first substrate, a second substrate facing the first substrate, a second alignment layer on the second substrate, and a liquid crystal layer between the first substrate and the second substrate and including liquid crystal molecules. The first alignment layer and the second alignment layer include a polymer including at least of polyamic acid, polyimide, and a combination including at least one of the foregoing polymers, and a compound including an epoxy cross-linker represented by Chemical Formula 1.

3 Claims, 6 Drawing Sheets (56) References Cited

U.S. PATENT DOCUMENTS

| | | | | |
|---|---|---|---|---|
| 2004/0009310 A1* | 1/2004 | Nakata | ................... | C08G 73/10 |
| | | | | 428/1.2 |
| 2006/0134348 A1* | 6/2006 | Momoi | ............. | G02F 1/133711 |
| | | | | 428/1.1 |
| 2008/0107831 A1 | 5/2008 | Kim et al. | | |
| 2010/0112323 A1* | 5/2010 | Mori | ....................... | B32B 27/34 |
| | | | | 428/220 |
| 2011/0230606 A1 | 9/2011 | Seo et al. | | |
| 2012/0172542 A1* | 7/2012 | Tsai | .................. | G02F 1/133723 |
| | | | | 525/449 |

FOREIGN PATENT DOCUMENTS

| | | |
|---|---|---|
| JP | 2011-128242 A | 6/2011 |
| KR | 1020020027007 A | 4/2002 |
| KR | 1020050030219 A | 3/2005 |
| KR | 1020060089648 A | 8/2006 |
| KR | 1020080032543 A | 4/2008 |
| KR | 1020090127865 A | 12/2009 |
| KR | 1020100029144 A | 3/2010 |
| KR | 1020100073993 A | 7/2010 |
| KR | 1020120113376 A | 10/2012 |

\* cited by examiner

LIQUID CRYSTAL ALIGNING AGENT AND LIQUID CRYSTAL DISPLAY DEVICE

This application claims priority to Korean Patent Application No. 10-2013-0102585, filed on Aug. 28, 2013, and all the benefits accruing therefrom under 35 U.S.C. §119, the content of which in its entirety is herein incorporated by reference.

BACKGROUND (1) Field

The present disclosure herein relates to a liquid crystal aligning agent, and more particularly, to a liquid crystal display device and a liquid crystal aligning agent used therein.

(2) Description of the Related Art

Liquid crystal display devices are generally classified as a twisted nematic mode liquid crystal display device, an in plane switching mode liquid crystal display device, or a vertical alignment mode liquid crystal display device.

In a vertical alignment mode liquid crystal display device, liquid crystal of a liquid crystal layer is aligned in a certain direction to have a pretilt angle when an electric field is not applied thereto. That is, the longitudinal axis of the liquid crystal molecules is vertically aligned with respect to a substrate of the liquid crystal display device. As a result, both the viewing angle and the contrast ratio of the liquid crystal display device are large.

The presence of an alignment layer on the substrate functions to align the liquid crystal molecules at the pretilt angle.

SUMMARY

In one or more embodiments, a liquid crystal display device having decreased defects and having high quality is provided.

In one or more embodiments, a liquid crystal aligning agent used for the manufacture of the liquid crystal display device is provided.

In one or more embodiments, a liquid crystal display device is provided including a first substrate, a first alignment layer on the first substrate, a second substrate facing the first substrate, a second alignment layer on the second substrate, and a liquid crystal layer between the first substrate and the second substrate and including liquid crystal molecules. The first alignment layer and the second alignment layer include a polymer including at least one of polyamic acid and polyimide, and a compound including an epoxy cross-linker represented by following Chemical Formula 1:

Chemical Formula 1

In Chemical Formula 1, x is an integer greater than or equal to 4, and R is a $C_1$ to $C_{10}$ hydrocarbon, or a $C_1$ to $C_{10}$ hydrocarbon comprising at least one of an amide group (—NH—CO—), an ester group (—CO—O—), an ether group (—O—), a sulfide group (—S—), a sulfoxide group (—SOO—), an imide group (—CO—N—CO—), an aza group (—NH—), an azo group (—N=N—), an aldehyde group (—CO—H), a carbonyl group (—CO—), an anhydride group (—CO—O—CO—), an urea group (—NH—CO—NH—), a hydroxide group (—OH), a halide group (—F, —Cl, —Br, —I), and an amine group (—$NH_2$).

In some embodiments, an amount of the epoxy cross-linker is greater than 0 to about 13 parts by weight based on 100 parts by weight of the polymer. In one embodiment, when x is 6, the amount of epoxy cross-linker is about 4.5 to about 9 parts by weight, and when x is 4, the amount of epoxy cross-linker is about 6.5 to about 13 parts by weight.

In other embodiments, the polymer comprises a tetracarboxylic acid dianhydride and a diamine compound. The amount of the diamine is about 40 to about 60 parts by weight based on 100 parts by weight of the polymer. The diamine compound includes a branched diamine compound including a $C_6$ to $C_{30}$ alkyl group and an amount of the diamine compound is about 5 to about 23 parts by weight based on 100 parts by weight of the polymer.

In still other embodiments, the branched diamine compound includes at least one compound represented by Chemical Formula 2:

Chemical Formula 2

In Chemical Formula 2, X is a bivalent organic group selected from —O—, —COO—, —OCO—, —NHCO—, —CONH—, and —CO—, and $R^5$ is a $C_6$ to $C_{30}$ alkyl group.

In even other embodiments, the diamine compound further includes at least one linear diamine compound represented by Chemical Formulae 3 and Chemical Formula 4:

Chemical Formula 3

In Chemical Formula 3, $R^6$ is a bivalent organic group having a cyclic structure including a nitrogen atom, and comprises at least one of a pyridine, pyrimidine, triazine, piperidine, and piperazine, X is a bivalent organic group, and each occurrence of X is the same or different.

Chemical Formula 4

In Chemical Formula 4, $R^9$ is a $C_1$ to $C_{12}$ hydrocarbon, p is an integer of 1 to 3, q is an integer of 1 to 20, and each occurrence of $R^9$ is the same or different.

In other embodiments, the first and second alignment layers are formed by using a liquid crystal aligning agent including a solvent, and a solid content present in the solvent. The solid content includes a polymer including at least one of polyamic acid and polyimide, an epoxy cross-linker represented by the Chemical Formula 1.

In some embodiments, the solvent includes at least one of γ-butyrolactone, ethylene glycol butyl ether, and N-methylpyrrolidone.

In exemplary embodiments, defects such as spots are decreased in the liquid crystal display device.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Rather, these embodiments are provided so that this disclosure will be thorough and complete, and will fully convey the scope of the inventive concept to those skilled in the art.

In the drawings, like reference numerals refer to like elements throughout. In the drawings, the dimensions of layers and regions are exaggerated for clarity of illustration. It will be understood that, although the terms first, second, etc. may be used herein to describe various elements, these elements should not be limited by these terms. These terms are only used to distinguish one element from another element. Thus, a first element discussed below could be termed a second element, and a second element discussed below could be termed a first element without departing from the teachings of the present inventive concept. As used herein, the singular forms are intended to include the plural forms as well, unless the context clearly indicates otherwise.

As used herein, the term "and/or" includes any and all combinations of one or more of the associated listed items The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," "includes" and/or "including" and "having," when used in this specification, specify the presence of stated features, numerals, steps, operations, elements, components, and/or parts or combinations thereof, but do not preclude the presence or addition of one or more other features, numerals, steps, operations, elements, components, and/or parts.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

It will also be understood that when an element or layer (or film) is referred to as being "on," "connected to," or "coupled to" another element or layer, the element or layer can be directly on, connected to or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other. Further, it will be understood that when an element or layer is referred to as being "under" another element or layer, it can be directly under the element or layer, and one or more intervening layers may also be present. In addition, it will also be understood that when an element or layer is referred to as being "between" two elements or layers, the element or layer can be the only element or layer between the two elements or layers, or one or more intervening layers may also be present. Like reference numerals refer to like elements throughout.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
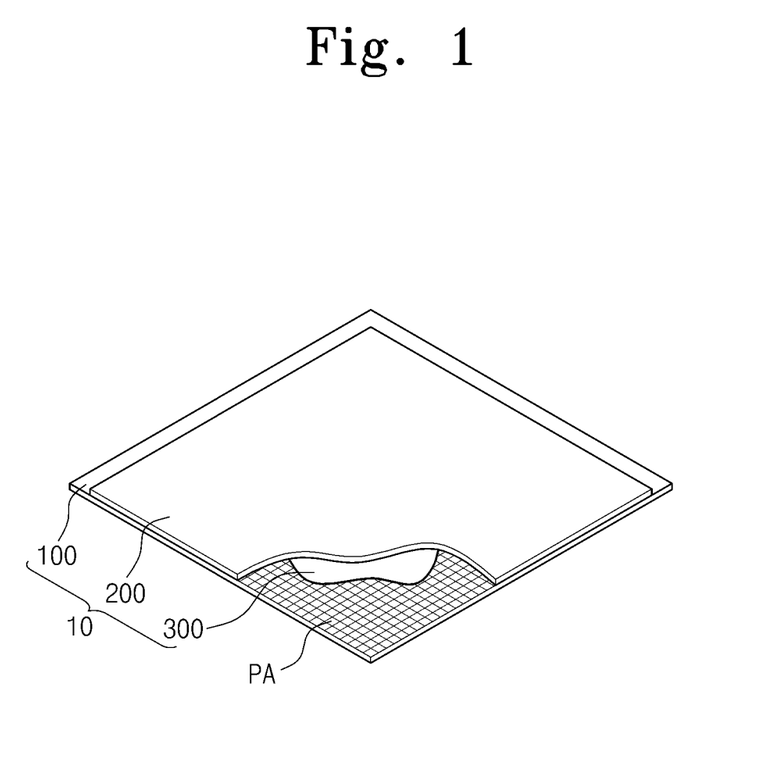
FIG. 1 is a perspective view of an exemplary embodiment of a liquid crystal display device according to the invention.
Figure 2:
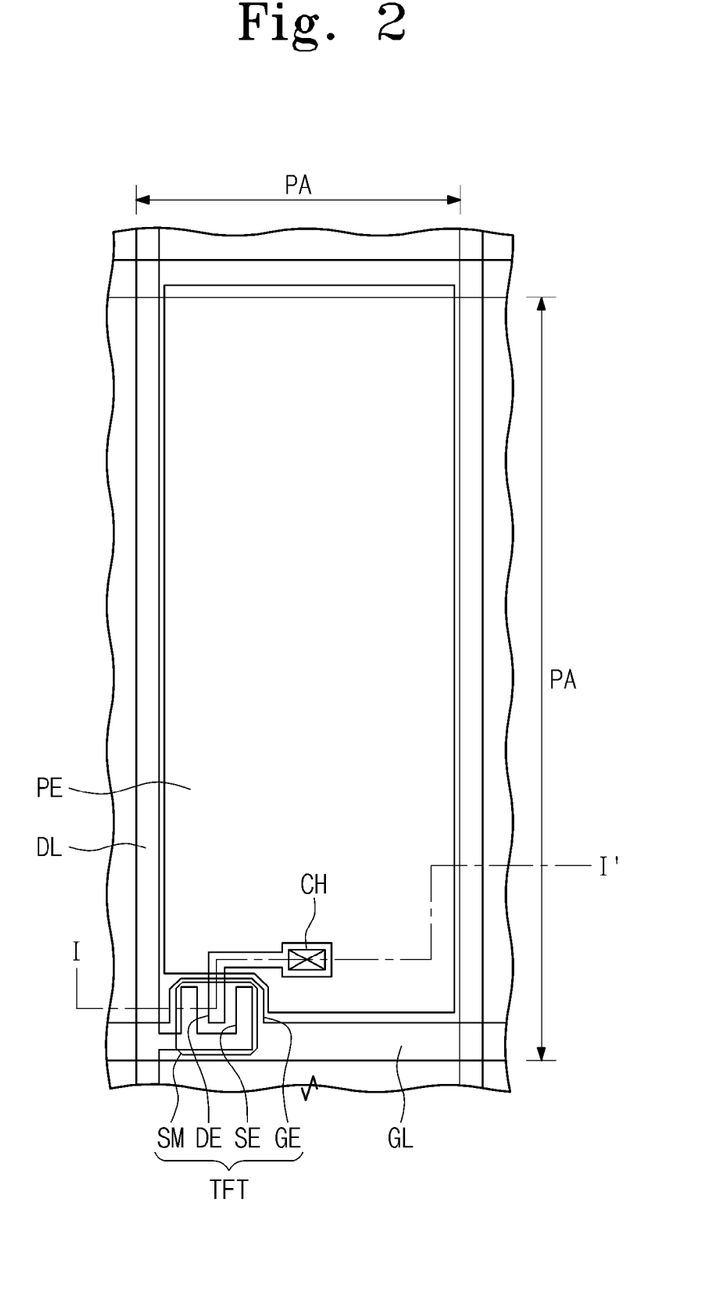
FIG. 2 is an enlarged plan view of an exemplary embodiment of a portion of the liquid crystal display device illustrated in FIG. 1.
Figure 3:
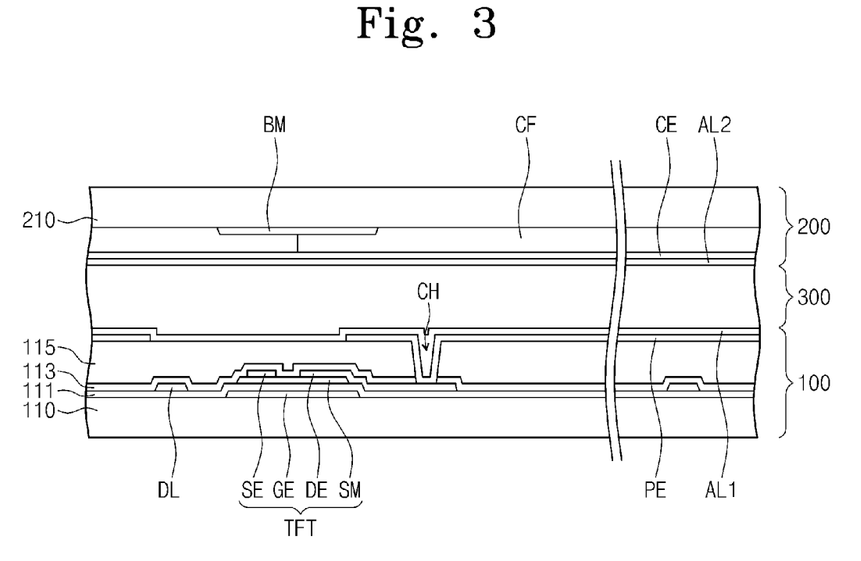
FIG. 3 is a cross-sectional view of an exemplary embodiment taken along a line I-I' of FIG. 2.

FIG. 1 is a perspective view of an exemplary embodiment of a liquid crystal display device according to the inventive concept. FIG. 2 is an enlarged plan view illustrating a portion of the liquid crystal display device illustrated in FIG. 1. FIG. 3 is a cross-sectional view taken along a line IT of FIG. 2.

Referring to FIGS. 1 to 3, a liquid crystal display device 10 includes a first substrate 100, a second substrate 200, and a liquid crystal layer 300 disposed between the first substrate 100 and the second substrate 200.

The first substrate 100 includes a first base substrate 110, a gate line GL, a data line DL, a thin film transistor TFT, a pixel electrode PE, and a first alignment layer AL1.

The first base substrate 110 includes a plurality of pixel areas PA. For convenience of explanation, only one pixel area PA is illustrated in FIGS. 2 and 3. However, the pixel areas PA are arranged as a matrix shape having a plurality of columns and a plurality of rows.

Since the pixel areas PA have the same structure, only one pixel area PA will be explained as an exemplary embodiment for convenience of explanation herein below. The pixel area PA is illustrated in FIG. 2 as having a rectangular shape extended in one direction, however, the shape is not limited thereto. The pixel area PA may have various shapes such as a V-shape, a Z-shape, or the like, or a combination thereof.

A gate line GL, a data line DL, a thin film transistor TFT, and a pixel electrode PE may be included in the pixel area PA.

The gate line GL may be provided (e.g., formed) on the first base substrate 110 and extend in one direction. The data line DL may be provided on the first base substrate 110 so as to cross (e.g., intersect) the gate line GL and be insulated from the gate line GL.

The thin film transistor TFT is provided near the intersection of the gate line GL and the data line DL. The thin film transistor TFT includes a gate electrode GE branched from the gate line GL, a source electrode SE branched from the data line DL, and a drain electrode DE separated from the source electrode SE.

The pixel electrode PE is connected to the drain electrode DE.

Referring to FIG. 3, the gate line GL and the gate electrode GE are provided in the pixel area PA on the first base substrate 110.

A semiconductor pattern SM is provided on the gate line GL with a first insulating layer 111 disposed between the semiconductor pattern SM and the gate line GL. The data line DL, the source electrode SE, and the drain electrode DE are provided on the first base substrate 110. In this case, the semiconductor pattern SM forms a conductive channel between the source electrode SE and the drain electrode DE.

On the first insulating layer 111 on which the source electrode SE and the drain electrode DE are formed, is a second insulating layer 113. On the second insulating layer 113 is a passivation layer 115. The pixel electrode PE is formed on the passivation layer 115. The pixel electrode PE is electrically connected to the drain electrode DE through the contact hole CH which penetrates the second insulating layer 113 and the passivation layer 115 and extends through a thickness thereof.

A first alignment layer AL1 is provided on the pixel electrode PE. The first alignment layer AL1 pretilts the liquid crystal molecules. The first alignment layer AL1 includes a polymer comprising at least one of polyamic acid, polyimide and a combination comprising at least one of the foregoing polymers, and a compound including an epoxy cross-lining agent.

The second substrate 200 facing the first substrate 100 is provided. The second substrate 200 includes a second base substrate 210, color filters CF, a black matrix BM, a common electrode CE, and a second alignment layer AL2.

The color filters CF and the black matrix BM are on the second base substrate 210. The common electrode CE and the second alignment layer AL2 are layered on the color filters CF and the black matrix BM one by one.

The color filter CF corresponds to the pixel area PA. Each of the color filters CF illustrates one of red color, green color and blue color. The black matrix BM is positioned between each of the color filters CF and blocks light from penetrating the liquid crystal layer 300 between the color filters CF. The common electrode CE is layered on the color filters CF and the black matrix BM. The second alignment layer AL2 is formed to cover the common electrode CE. The second alignment layer AL2 pre-tilts the liquid crystal molecules. The second alignment layer AL2 includes a polymer comprising at least one of polyamic acid, polyimide, and a combination comprising at least one of the foregoing polymers, and a compound including an epoxy cross-linker.

The liquid crystal layer 300 is between the first alignment layer AL1 and the second alignment layer AL2. The liquid crystal layer 300 may have a vertical alignment type liquid crystal mode.

Even though not illustrated, slits or protrusions may be provided in at least one of the pixel electrode PE and the common electrode CE.

When the thin film transistor TFT is turned on in response to a driving signal provided through the gate line GL, an image signal transmitted through the data line DL is provided to the pixel electrode PE through the turned-on thin film transistor TFT. Thus, an electrical field is formed between the pixel electrode PE and the common electrode CE, to which common voltage is applied. In response to the electric field, liquid crystal molecules of the liquid crystal layer 300 are driven, and an image is displayed according to the dosage of light penetrating the liquid crystal layer 300.

The liquid crystal layer having the exemplary above-described structure may be manufactured by forming a first substrate, forming a first alignment layer on the first substrate, forming a second substrate apart from the first substrate, forming a second alignment layer on the second substrate, and forming a liquid crystal layer between the second substrate and the first substrate.

The first substrate may be formed to include a wiring part including gate lines and data lines, thin film transistors, and pixel electrodes. The second substrate may be formed to include color filters, a black matrix, and a common electrode on the second base substrate.

The first liquid crystal layer may be formed by a one drop filling ("ODF") process by which liquid crystal is dropped on one of the first substrate and the second substrate.

The first alignment layer and the second alignment layer may be formed by coating a liquid crystal aligning agent on each of the first base substrate and the second base substrate, and curing the liquid crystal alignment layer. Methods of forming the liquid crystal alignment layer on the base substrate are not specifically limited. In various embodiments, the liquid crystal alignment layer may be formed on the first and second base substrates using at least one of a spin coating method, a slit coating method, an injection method, and the like, because the liquid crystal aligning agent is provided as a liquid state. The curing process may include a pre-curing step conducted at a first temperature and a main curing step conducted at a second temperature higher than the first temperature. The main curing step may be conducted for longer time period than the pre-curing step. Through the pre-curing step, most of the solvents within the liquid crystal aligning agent may be removed. Through the main curing step, the polymerization of the polymer may be substantially completed.

The liquid crystal aligning agent includes a solvent and a solid content included in the solvent. The solvent is contained by from about 90 wt % to about 95 wt %, and the solid content is contained by from about 5 wt % to about 10 wt % based on the total liquid crystal aligning agent.

The solid content includes a polymer including at least one of polyamic acid, polyimide, and a combination comprising at least one of the foregoing polymers, and an epoxy cross-linking agent (e.g., epoxy cross-linker).

The solvent dissolves the polymer and the epoxy cross-linker so that the liquid crystal aligning agent may be coated on the substrate in a liquid state. The solvent includes at least one of γ-butyrolactone (γ-BL), ethylene glycol butyl ether (or butyl cellosolve, BC), N-methylpyrrolidone (NMP), and a combination comprising at least one of the foregoing compounds.

The polyamic acid may be obtained by polymerizing a tetracarboxylic acid dianhydride with a diamine compound, and the polyimide may be obtained by dehydrating and cyclizing the polyamic acid. In an embodiment, the amount of tetracarboxylic acid dianhydride may be about 40 to about 60 parts by weight based on 100 parts by weight of the polymer, and in another embodiment, the amount of tetracarboxylic acid dianhydride may be about 50 parts by weight. In an embodiment, the amount of diamine compound may be about 40 to about 60 parts by weight based on 100 parts by weight of the polymer, and in another embodiment, the amount of diamine compound may be about 50 parts by weight.

In an exemplary embodiment, the tetracarboxylic acid dianhydride includes at least one of butanetetracarboxylic acid dianhydride, 1,2,3,4-cyclobutanetetracarboxylic acid dianhydride, 5-(2,5-dioxotetrahydro-3-furanyl)-3-methyl-3-cyclohexene-1,2-dicarboxylic acid dianhydride, 1,2-dimethyl-1,2,3,4-cyclobutanetetracarboxylic acid dianhydride, 1,3-dimethyl-1,2,3,4-cyclobutanetetracarboxylic acid dianhydride, 1,3-dichloro-1,2,3,4-cyclobutanetetracarboxylic acid dianhydride, 1,2,3,4-tetramethyl-1,2,3,4-cyclobutanetetracarboxylic acid dianhydride, 1,2,3,4-cyclopentanetetracarboxylic acid dianhydride, 1,2,4,5-cyclohexanetetracarboxylic acid dianhydride, 3,3',4,4'-dicyclohexyl tetracarboxylic acid dianhydride, 2,3,5-tricarboxycyclopentyl acetic acid dianhydride, 3,5,6-tricarboxy norbornene-2-acetic acid dianhydride, 2,3,4,5-tetrahydrofuran tetracarboxylic acid dianhydride, 1,3,3a,4,5,9b-hexahydro-5 (tetrahydro-2,5-dioxo-3-furanyl)-naphtho[1,2-c]-furan-1,3-dione, 1,3,3a,4,5,9b-hexahydro-5-methyl-5(tetrahydro-2,5-dioxo-3-furanyl)-naphtho[1,2-c]-furan-1,3-dione, 1,3,3a,4,5,9b-hexahydro-5-ethyl-5(tetrahydro-2,5-dioxo-3-furanyl)-naphtho[1,2-c]-furan-1,3-dione, 1,3,3a,4,5,9b-hexahydro-7-methyl-5(tetrahydro-2,5-dioxo-3-furanyl)-naphtho[1,2-c]-furan-1,3-dione, 1,3,3a,4,5,9b-hexahydro-7-ethyl-5 (tetrahydro-2,5-dioxo-3-furanyl)-naphtho[1,2-c]-furan-1,3-dione, 1,3,3a,4,5,9b-hexahydro-8-methyl-5 (tetrahydro-2,5-dioxo-3-furanyl)-naphtho[1,2-c]-furan-1,3-dione, 1,3,3a,4,5,9b-hexahydro-8-ethyl-5(tetrahydro-2,5-dioxo-3-furanyl)-naphtho[1,2-c]-furan-1,3-dione, 1,3,3a,4,5,9b-hexahydro-5,8-dimethyl-5 (tetrahydro-2,5-dioxo-3-furanyl)-naphtho[1,2-c]-furan-1,3-dione, 5-(2,5-dioxotetrahydrofuryl)-3-methyl-3-cyclohexene-1,2-dicarboxylic acid dianhydride, bicyclo[2,2,2]-oct-7-en-2,3,5,6-tetracarboxylic acid dianhydride, 3-oxabicyclo[3,2,1]octane-2,4-dion-6-spiro-3'-(tetrahydrofuran-2',5'-dione), 3,5,6-tricarboxy-2-carboxy norbornene-2:3,5:6-dianhydride, bicycle[3.3.0]octane-2,4,6,8-tetracarboxylic acid dianhydride, and compounds represented by the following Chemical Formulae 1-1 and 1-2. The compounds may be used alone or as a combination of two or more.

Chemical Formula 1-1

Chemical Formula 1-2

Wherein, $R^1$ and $R^2$ represent a bivalent organic group including an aromatic ring, $R^2$ and $R^4$ represent a hydrogen atom or a $C_1$ to $C_5$ alkyl group, and $R^2$ and $R^4$ may be the same or different.

The diamine compound and the tetracarboxylic acid dianhydride may combine to make a main chain of an alignment layer. The diamine compound includes at least one of a branched diamine compound including a $C_6$ to $C_{30}$ alkyl branch a linear diamine compound in which two amines are combined linearly, and a combination of at least one of the foregoing diamine compounds. The diamine compound is capable of imparting vertical aligning properties to the liquid crystal molecules.

In an exemplary embodiment, when the amount of the diamine compound is about 50 parts by weight based on 100 parts by weight of the polymer, the amount of branched diamine compound may be about 5 to about 23 parts by weight, and the amount of linear diamine compound may be about 45 to about 27 parts by weight. In another exemplary embodiment, the amount of branched diamine compound may be about 5 to about 7.5 parts by weight.

The branched diamine compound may include at least one compound represented by the following Chemical Formula 2.

Chemical Formula 2

Wherein, in Chemical Formula 2, X is a bivalent organic group selected from —O—, —COO—, —OCO—, —NHCO—, —CONH—, and —CO—, and $R^5$ is a $C_6$ to $C_{30}$ alkyl group.

The linear diamine compound may include at least one linear diamine compound represented by the following Chemical Formula 3 and Chemical Formula 4.

Chemical Formula 3

In Chemical Formula 3, $R^6$ is a bivalent organic group having a cyclic structure including a nitrogen atom and includes at least one of a pyridine, pyrimidine, triazine, piperidine, and piperazine, X is a bivalent organic group, and each occurrence of X may be the same or different.

Chemical Formula 4

In Chemical Formula 4, $R^9$ is a $C_1$ to $C_{12}$ hydrocarbon, p is an integer of 1 to 3, q is an integer of 1 to 20, and each occurrence of $R^9$ may be the same or different.

The epoxy cross-linker bonds with the polymer and cross-links the polymer chains, and as a result, the hardness and density of the surface of the alignment layer may be increased. The epoxy cross-linker reinforces the elasticity of the alignment layer with respect to an external force to make a strong structure to spot by supporting the branched diamine compound.

The epoxy cross-linker may have a structure represented by following Chemical Formula 1.

Chemical Formula 1

Wherein, R is an unsubstituted $C_1$ to $C_{10}$ hydrocarbon or a substituted $C_1$ to $C_{10}$ hydrocarbon including at least one of an amide group (—NH—CO—), an ester group (—CO—O—), an ether group (—O—), a sulfide group (—S—), a sulfoxide group (—SOO—), a hydroxide group (—OH), an imide group (—CO—N—CO—), an aza group (—NH—), an azo group (—N=N—), an aldehyde group (—CO—H), a carbonyl group (—CO—), an anhydride group (—CO—O—CO—), and an urea group (—NH—CO—NH—), and x is an integer of greater than or equal to 4.

In an embodiment of the inventive concept, the amount of epoxy cross-linker may be greater than 0 to about 13 parts by weight based on 100 parts by weight of the polymer. When the amount of the epoxy cross-linker exceeds about 13 parts by weight based on 100 parts by weight of the polymer in the liquid crystal aligning agent, defects such as afterimage, or a drop spot, or the like may be observed. That is, when an excessive amount of the epoxy cross-linker is included in the liquid crystal aligning agent, unreacted epoxy cross-linker may remain, and undesired additional reactions may occur.

In an exemplary embodiment, x may be 4 or 6. When x is 6, the amount of epoxy cross-linker may be about 4.5 to about 9 parts by weight based on 100 parts by weight of the polymer, and when x is 4, the amount of epoxy cross-linker may be about 6.5 to about 13 parts by weight based on 100 parts by weight of the polymer.

In the liquid crystal display device having the above-described exemplary structure, the generation of spots or an afterimage may be decreased, and an image having high quality may be provided. Hereinafter, detailed description on the effects will be described.

Example 1

Evaluation of Oblique Line Spot

A liquid crystal display device was manufactured by forming first and second alignment layers while varying the amount of epoxy cross-linker included in the liquid crystal aligning agent, and the degree of oblique line spot formation in the liquid crystal display device was detected. The results are illustrated in the following Table 1. The pre-curing temperature used to form the first and second alignment layers was 72° C.

TABLE 1

| Amount of epoxy cross-linker (wt %) | Increment of epoxy cross-linker (% increase) | Oblique line spot degree (0-5) |
|---|---|---|
| 4.80 | 0 | 3 |
| 6.24 | 30 | 1.5 |
| 7.20 | 50 | 1 |
| 8.16 | 70 | 0 |
| 8.64 | 80 | 0 |
| 9.60 | 100 | 0 |

In Table 1, an epoxy cross-linker having 6 epoxy groups per unit epoxy cross-linking compound was used (e.g., x=6 in Chemical Formula 1), and with the exception of the amount of epoxy cross-linker, all of the conditions were the same.

In Table 1, the amount of the cross-linker is shown as a weight percent (wt %) of added epoxy cross-linker based on 100 wt % of the polymer in the liquid crystal aligning agent. Hereinafter, the amounts are indicated by weight percent unless otherwise specified separately.

The oblique line spot is a defect perceived from an image regardless of gray scale. When the liquid crystal display device has a rectangular shape, the oblique line spot is shown as an oblique line with respect to one side. The oblique line spot may be generated by the change of the azimuth angle of liquid crystal molecules due to minute changes in the surface of the alignment layer. The oblique line spot may become severe when the alignment layer is subjected to a drying process using an air knife after forming the alignment layer.

In the above Table 1, the degree of observable oblique line spots was evaluated using a scale of 0 to 5 according to the degree of the spot. After observing an image of the liquid crystal display device with the naked eye, the degree was defined as 0 when the oblique line spot(s) was not observed, and the degree was defined as 5 when the oblique line spot(s) was clearly observed.

Referring to Table 1, when the epoxy cross-linker is added in an amount of 4.80% based on 100 wt % of the polymer, the oblique line spot degree was 3, and the oblique line spot decreased as the amount of the epoxy cross-linker in the alignment layers was increased. The oblique line spots had an incline of 40 to 45 degrees, or 20 to 25 degrees with respect to one side of the liquid crystal display device and had a distance of about 5 millimeters (mm) to about 20 mm. As the amount of the epoxy cross-linker was increased, the oblique line spot was decreased. In particular, when the amount of the epoxy cross-linker was 8.16% or greater, the oblique line spot was not observed. Without being limited by theory, it is thought that the hardness and the density of the alignment layer may be increased through the combination of the polymer with increasing amounts of the epoxy cross-linker. Thus, the elasticity of the alignment layer may be reinforced with respect to an external force, and deformation of the alignment layer may be prevented.

Example 2

Surface Analysis of Alignment Layer According to the Increase of Cross-Linker

Figure 4:
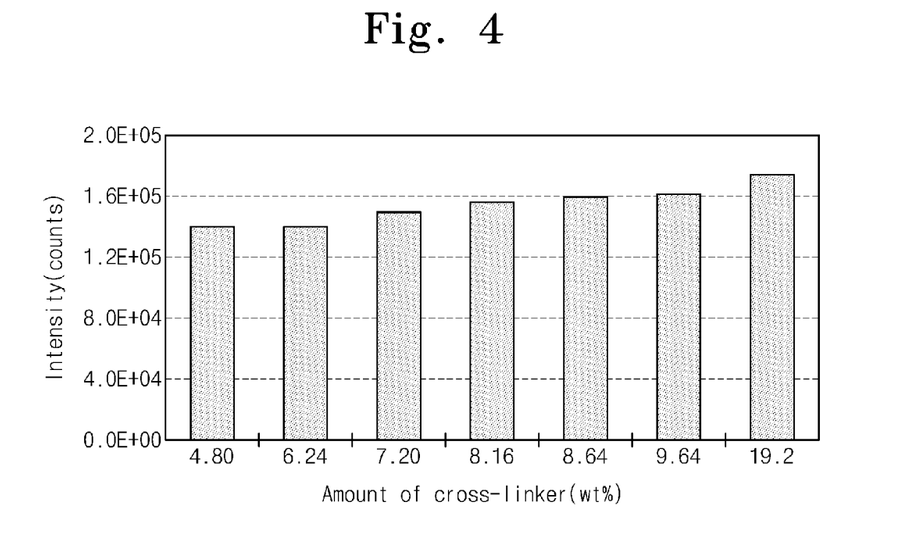
FIG. 4 is a graph showing the intensity of an exemplary epoxy cross-linker versus the amount of epoxy cross-linker as measured by time of flight secondary ion mass spectrometry (TOF-SIMS)

FIG. 4 is a graph showing the intensity of the epoxy cross-linker versus the amount of epoxy cross-linker as measured by time of flight secondary ion mass spectrometry ("TOF-SIMS").

In FIG. 4, the alignment layer was formed by changing the amount of the epoxy cross-linker included in a liquid crystal aligning agent, and the intensity of the epoxy cross-linker in the alignment layer was detected using the TOF-SIMS.

As shown in FIG. 4, as the amount of the epoxy cross-linker in the liquid crystal aligning agent was increased, the frequency of detecting the epoxy compound at the surface of the formed alignment layer was also increased. Thus, when the amount of the epoxy cross-linker was increased, the combined product of the epoxy cross-linker with the polymer was detected at the surface of the alignment layer.

Figure 5:
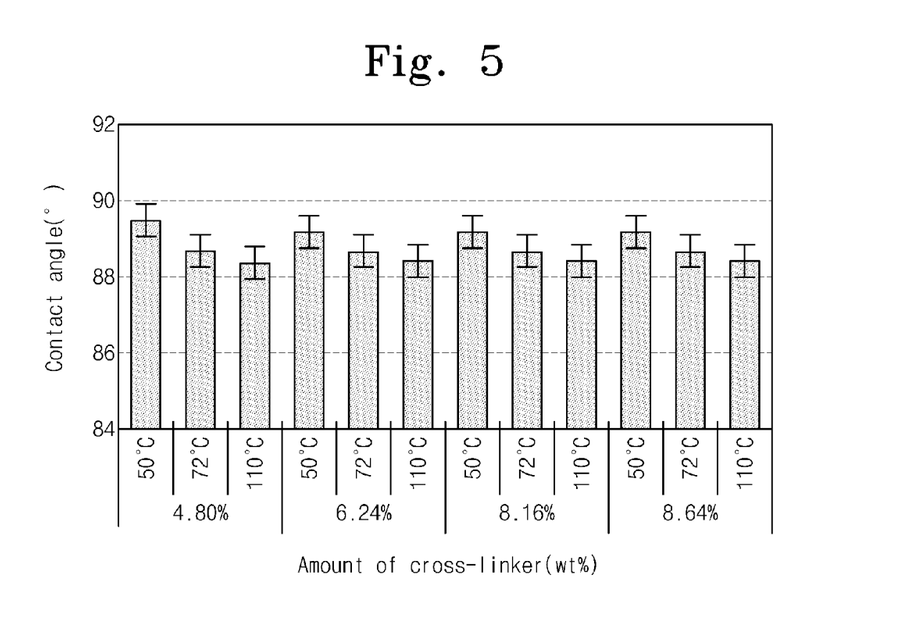
FIG. 5 is a graph illustrating the contact angle of the surface of an exemplary alignment layer versus the amount of an epoxy cross-linker.

FIG. 5 is a graph illustrating the contact angle of the surface of an alignment layer versus the amount of the epoxy cross-linker. After forming the alignment layer using varying amounts of the epoxy cross-linker in the liquid crystal aligning agent, a drop of water was applied to the alignment layer. The contact angle illustrated in FIG. 5 refers to the contact angle of the drop of water with respect to the surface of the alignment layer. In FIG. 5, the temperature is the pre-curing temperature used to form the alignment layer. The pre-curing temperatures were 50° C., 72° C. and 110° C.

Referring to FIG. 5, as the amount of the epoxy cross-linker was increased, the contact angle at the surface of the formed alignment layer was decreased. The result suggests that the surface energy of the alignment layer may be increased as the amount of the epoxy cross-linker increases. As the pre-curing temperature was increased, the contact angle at the surface of the alignment layer was also decreased. This result suggests that the surface energy of the alignment layer may be increased as the pre-curing temperature increases.

While the data is not shown, when the epoxy cross-linker was included in an amount of 12 wt % based on 100 wt % of the polymer in the liquid crystal aligning agent, the pencil hardness of the alignment layer was 3H.

Example 3

Evaluation of Drop Spot

When a liquid crystal layer is formed by an ODF method for manufacturing a liquid crystal display device, a drop spot may be formed. The drop spot includes spots formed due to the potential energy of liquid crystals when dropping the liquid crystals and/or spots formed due to the concentration gradient of the liquid crystals. The former spots (e.g., spots formed due to the potential energy of liquid crystals when dropping the liquid crystals) correspond to the direct deformation of the alignment layer due to the potential energy associated with the dropping of the liquid crystals, or due to the discharge pressure of the liquid crystals. The deformation of the alignment layer may also be generated due to a change in the aligning direction caused by suppression of the branched portion of the alignment layer, or due to mechanical stress. The latter spot (e.g., spots formed due to the concentration gradient of the liquid crystals) may be generated by the difference in the concentration gradient of impurities or compounds in a drop of the liquid crystal, resulting in the transformation of the alignment layer as the drop of liquid crystal spreads after being dropped.

The evaluation of the former drop spot may be conducted by the measure of a pretilt angle after rubbing. The maintenance of the aligning properties of the alignment layer with respect to an external force (that is, the aligning degree as represented by the pretilt angle) is capable of showing the tolerance degree with respect to the drop stain.

Figure 6:
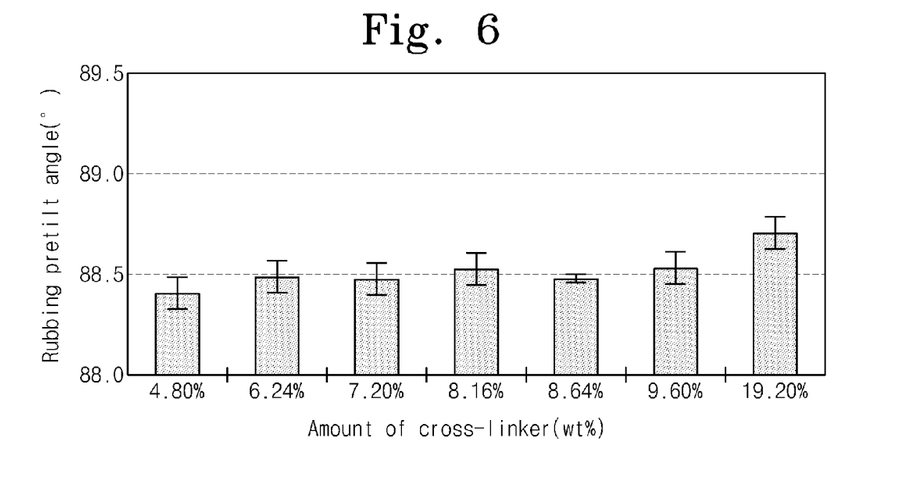
FIG. 6 is a graph illustrating the pretilt angle after rubbing when forming an alignment layer versus the amount of epoxy cross-linker in a liquid crystal aligning agent.

FIG. 6 is a graph illustrating a pretilt angle after rubbing when forming an alignment layer versus the amount of epoxy cross-linker in a liquid crystal aligning agent.

Referring to FIG. 6, as the amount of the epoxy cross-linker was increased, the rubbing pretilt angle was also increased. However, a stable rubbing pretilt angle of about 88 to 89 degrees was observed with all of the amounts of the epoxy cross-linker tested (from greater than 0 to 19.20 wt %). Thus, it was confirmed that the drop spot was not generated when the epoxy cross-linker was added.

The latter drop spot may be evaluated by the wettability of the alignment layer, determined by measuring the contact angle of the liquid crystal with respect to the alignment layer. The wettability of the alignment layer may be examined by forming an alignment layer, dropping the liquid crystal on the alignment layer, and measuring the contact angle of the dropped liquid crystal.

Figure 7:
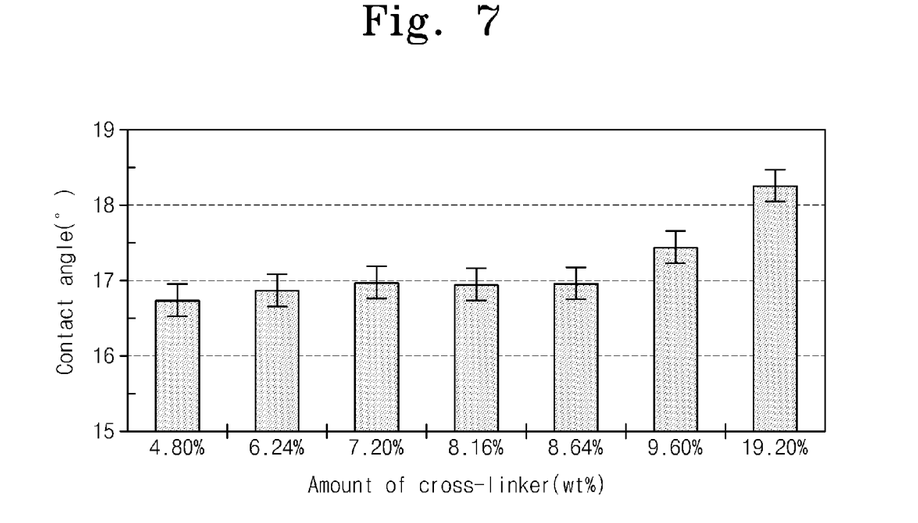
FIG. 7 is a graph illustrating the contact angle of a certain liquid crystal when an alignment layer is formed versus the amount of an epoxy cross-linker in a liquid crystal aligning agent.

FIG. 7 is a graph illustrating the contact angle of a certain liquid crystal when an alignment layer is formed versus the amount of an epoxy cross-linker present in a liquid crystal aligning agent. In FIG. 7, all of the conditions were the same except for the amount of the cross-linker.

Referring to FIG. 7, as the amount of the cross-linker was increased, the contact angle of the liquid crystal was also increased. The increase of the contact angle of the liquid crystal may mean the deterioration of the wettability of the liquid crystal. When the amount of the epoxy cross-linker was less than about 9.60 wt %, the contact angle was 18 degrees or less. When the amount of the epoxy cross-linker was about 19.20 wt %, the contact angle was up to about 18.4 degrees.

Example 5

Evaluation of Voltage Holding Ratio

Figure 8:
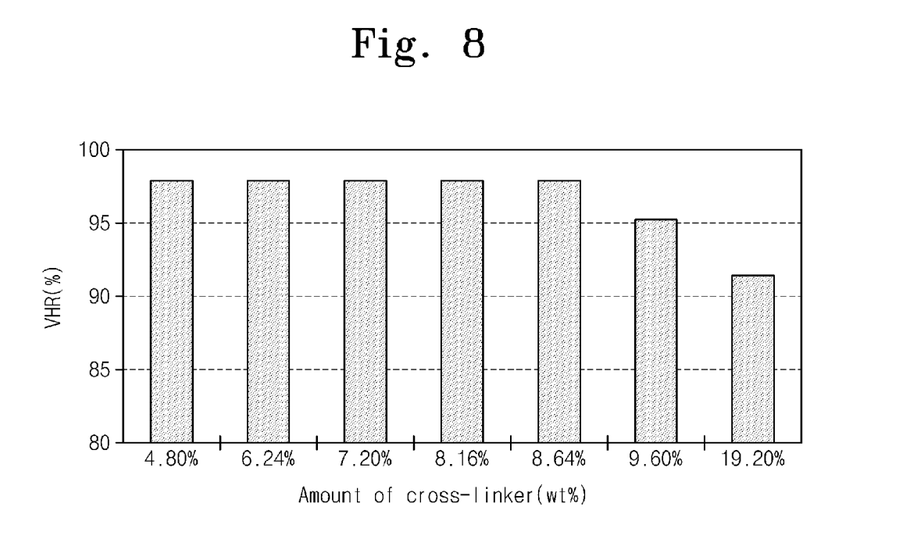
FIG. 8 is a graph illustrating the voltage holding ratio (VHR) versus the amount of an epoxy cross-linker in a liquid crystal aligning agent for a liquid crystal display device including first and second alignment layers.

FIG. 8 is a graph showing the voltage holding ratio ("VHR") versus the amount of epoxy cross-linker in the liquid crystal aligning agent of the liquid crystal display device.

Referring to FIG. 8, when the amount of the epoxy cross-linker in the liquid crystal alignment layer was less than about 9.60 wt %, the voltage holding ratio was 95% or above. When the amount of the epoxy cross-linker was about 19.20 wt %, the voltage holding ratio was remarkably low at 92%. In particular, when the amount of the epoxy cross-linker in the liquid crystal alignment layer was 8.64 wt % or less, the voltage holding ratio was 97% or greater. Based on these results, it is believed that defects are due to the presence of an unreacted epoxy cross-linker which occurred when an excessive amount of the epoxy cross-linker was added into the liquid crystal aligning agent while forming the alignment layer.

Example 6

Evaluation on Rework Processability

When defects are generated during manufacturing of a liquid crystal display device, particularly during the formation of an alignment layer, the liquid crystal display device may be manufactured by performing a rework process, through which the alignment layer may be removed using an alignment layer removing solution, and re-forming the alignment layer again.

Table 2 illustrates the separation degree of the alignment layer when immersing a substrate including an alignment layer having the defects into the alignment layer removing solution. When the alignment layer was clearly separated from the substrate without any remaining residue, the rework processability was designated as "OK". In this case, all of the conditions, except for the amount of the epoxy cross-linker, were the same.

Referring to Table 2, the alignment layers were easily separated from the substrate when the amounts of the epoxy cross-linker were 4.8 wt %, 6.24 wt %, 8.16 wt %, and 9.60 wt %. From the results, it was confirmed that the physical properties, such as viscosity of the liquid crystal aligning agent, were not largely affected by the amount of the epoxy cross-linker.

TABLE 2

| Amount of epoxy cross-linker | Rework solution temperature: 55° C. Immersing time (min) | | | |
|---|---|---|---|---|
| | 2 | 4 | 10 | 15 |
| 4.8% | OK | OK | OK | OK |
| 6.24% | OK | OK | OK | OK |
| 8.16% | OK | OK | OK | OK |
| 9.60% | OK | OK | OK | OK |

Example 7

Evaluation of Solid Content and Solvent in Liquid Crystal Aligning Agent

Table 3 illustrates the generation of spots which occurs when changing the amount of the solid content in a solution while maintaining all the conditions concerning the liquid crystal aligning agent the same. The amounts of NMP and γ-BL as solvents were changed, and the temperature at the pre-curing step was also changed. In Table 3, the amount of the cross-linker was fixed at 8.16 wt % based on 100 wt % of the polymer, and butyl cellusolve (BC) was included in addition to NMP and γ-BL in the solvent.

With reference to Table 3, either no significant difference was found for the spot, or the generation of the spot was decreased, when changing the solid content, the solvent, or the pre-curing temperature. In particular, no significant difference was found for the spot by changing the ratio of the solid content or the amount of the solvent.

TABLE 3

| Conditions | Range tested | Results |
|---|---|---|
| Amount of cross-linker | 8.16% | No spot |
| Solid content ratio in solution | 5.5-7.3% | No significant result |
| Amount of NMP | 45-50% | No significant result |
| Amount of γ-BL | 0-8% | No significant result |
| Pre-curing temperature | 72° → 90-110° | No spot |
| | 95° → 115° | Spot improvement |

Example 8

Evaluation According to the Kind of Diamine Compound

After manufacturing a liquid crystal display device through forming first and second alignment layers and by changing the amounts of the linear diamine compound and the branched diamine compound in the liquid crystal aligning agent, oblique line spots were detected and the results are as follows. The sum of the linear diamine compound and the branched diamine compound was fixed to 50 wt % based on 100 wt % of the total polymer, and the oblique line spot was examined by changing the amount of the branched diamine compound to the sum of 50 wt %.

When the amount of the branched diamine compound was 7.5 wt % or less, the oblique line spot degree was decreased from 3 to 1. However, when the amount of the branched diamine compound was 5 wt % or less, an amorphous texture spot was generated, and when the amount of the branched diamine compound exceeded 23 wt %, the oblique line spot was increased.

Example 9

Evaluation of Spots According to the Amount of Solvent

In Table 4, the results of the evaluation of the oblique line spot are illustrated after forming first and second alignment layers using a liquid crystal aligning agent containing NMP, γ-BL, and BC as solvents, and manufacturing a liquid crystal display device. In Table 4, all of the conditions except for the amount of the solvent were the same.

TABLE 4

| Solid content | Solvent ratio | | | Oblique line spot |
|---|---|---|---|---|
| (%) | γ-BL | NMP | BC | degree (0-5) |
| 6.9 | 0 | 45 | 55 | 3 |
| 6.7 | 5 | 40 | 55 | 3 |
| 6.7 | 8 | 37 | 55 | 3 |
| 6.7 | 0 | 50 | 50 | 3 |

Referring to FIG. 4, similar degrees of the oblique line spot are illustrated regardless of the kind of the solvents.

Thus, it was confirmed that the generation of the defects of the oblique line spot was not substantially influenced by the kind of the solvent.

Example 10

Evaluation of Spots According to the Amount of Solid Content

In Table 5, the results are shown for the evaluation of the oblique line spot formation which occurs after forming first and second alignment layers by using a liquid crystal aligning agent containing NMP, γ-BL, and BC as solvents, and manufacturing a liquid crystal display device. In Table 5, all of the conditions except for the amount of the solid content were the same.

TABLE 5

| Solid content | Solvent ratio | | | Oblique line spot degree |
|---|---|---|---|---|
| (wt %) | γ-BL | NMP | BC | (0-5) |
| 6.9 | 0 | 45 | 55 | 3 |
| 7.3 | 0 | 45 | 55 | 3 |
| 5.5 | 0 | 45 | 55 | 2.5 |

Referring to Table 5, similar degrees of the oblique line spot are illustrated regardless of the amount of the solid content. Thus, it was confirmed that the generation of oblique line spot defects was not substantially influenced by the amount of the solid content.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display device, comprising:
a first substrate;
a first alignment layer on the first substrate;
a second substrate facing the first substrate;
a second alignment layer on the second substrate; and
a liquid crystal layer disposed between the first substrate and the second substrate, and comprising liquid crystal molecules,
wherein the first alignment layer and the second alignment layer comprise a polymer comprising at least one of polyamic acid, polyimide, and a combination comprising at least one of the foregoing polymers, and an epoxy cross-linker represented by Chemical Formula 1:

Chemical Formula 1 wherein, x is 6, R is an unsubstituted $C_2$ to $C_{10}$ hydrocarbon, or a substituted $C_2$ to $C_{10}$ hydrocarbon comprising at least one of an amide group (—NH—CO—), an ester group (—CO—O—), an ether group (—O—), a sulfide group (—S—), a sulfoxide group (—SOO—), an imide group (—CO—N—CO—), an aza group (—NH—), an azo group (—N=N—), an aldehyde group (—CO—H), a carbonyl group (—CO—), an anhydride group (—CO—O—CO—), an urea group (—NH—CO—NH—), a hydroxide group (—OH), a halide group (—F, —Cl, —Br, —I), and an amine group (—NH$_2$), wherein an amount of the epoxy cross-linker is about 4.5 to about 9 parts by weight, based on 100 parts by weight of the polymer, wherein the polymer comprises a polymerization product of a tetracarboxylic acid dianhydride and a diamine compound, wherein the diamine compound comprises about 5 to about 23 parts by weight, based on 100 parts by weight of the polymer, of a branched diamine compound comprising a $C_6$ to $C_{30}$ alkyl group, which comprises at least one compound represented by Chemical Formula 2:

Chemical Formula 2 wherein, X is a bivalent organic group selected from —O—, —COO—, —OCO—, —NHCO—, —CONH— and —CO—, and $R^5$ is a $C_6$ to $C_{30}$ alkyl group, and wherein a contact angle of liquid crystals at a surface of the first alignment layer and a surface of the second alignment layer comprising the polymer is 16.5 to 18 degrees.

2. The liquid crystal display device of claim 1, wherein an amount of the diamine compound is about 40 to about 60 parts by weight, based on 100 parts by weight of the polymer.

3. The liquid crystal display device of claim 1, wherein the diamine compound further comprises at least one linear diamine compound represented by Chemical Formula 3 and Chemical Formula 4:

Chemical Formula 3 wherein, $R^6$ is a bivalent organic group having a cyclic structure comprising a nitrogen atom, and comprises at least one of a pyridine, pyrimidine, triazine, piperidine, and piperazine, X is a bivalent organic group, and each occurrence of X is the same or different, Chemical Formula 4 wherein, $R^9$ is a $C_1$ to $C_{12}$ hydrocarbon,
p is an integer of 1 to 3,
q is an integer of 1 to 20, and
each occurrence of $R^9$ is the same or different.

* * * * *